Jan. 3, 1967  R. J. KRAGLE  3,295,872
CLAMP FOR ROD LIKE ELEMENTS SUCH AS A CABLE
Filed Sept. 29, 1964
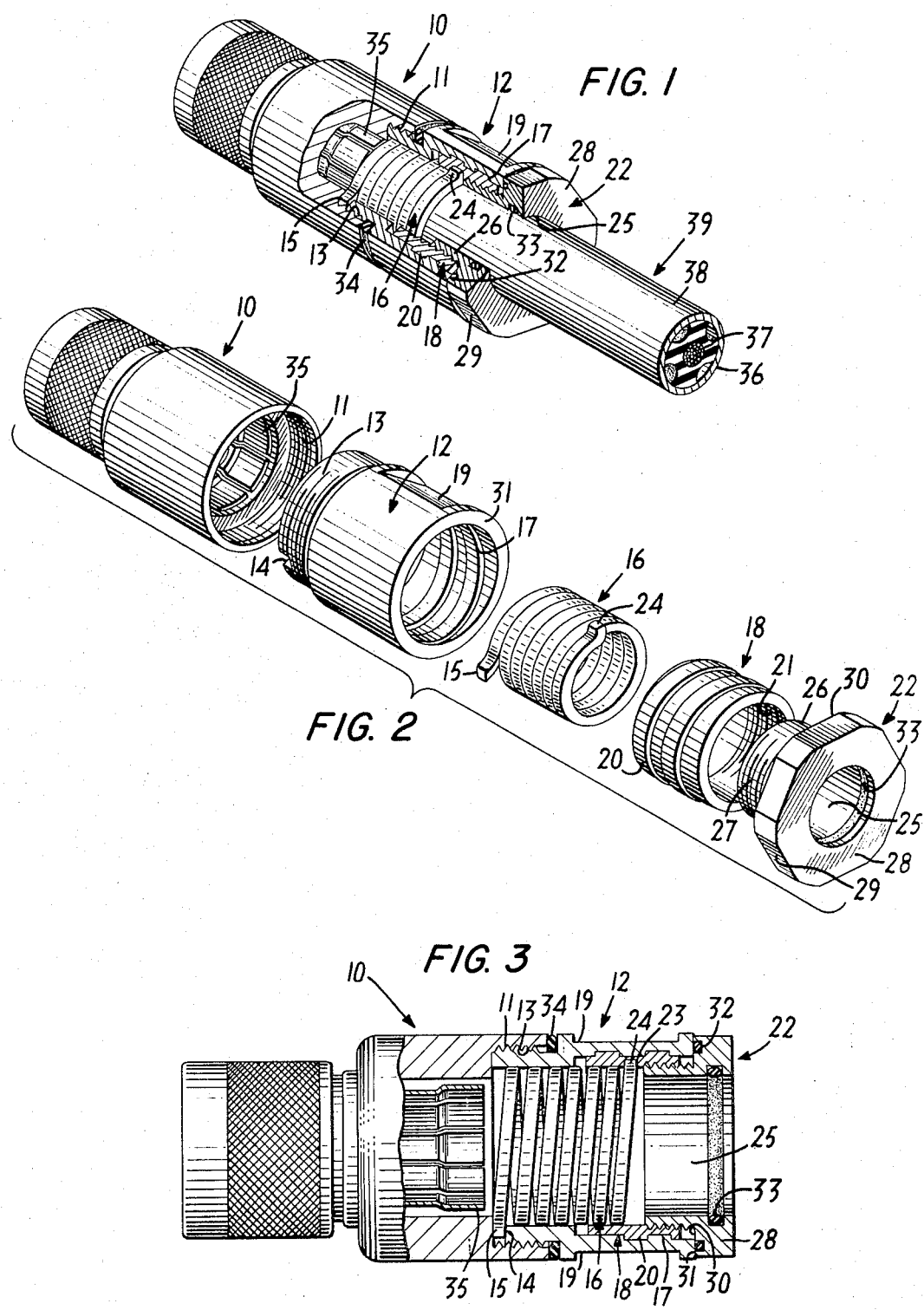

United States Patent Office 3,295,872
Patented Jan. 3, 1967

3,295,872
CLAMP FOR ROD LIKE ELEMENTS SUCH AS A CABLE
Ralph J. Kragle, Cheshire, Conn., assignor to The International Silver Company, Meriden, Conn., a corporation of Connecticut
Filed Sept. 29, 1964, Ser. No. 399,928
5 Claims. (Cl. 287—115)

This invention relates in general to clamps for rod like elements and more particularly to cable connector clamps for use in joining coaxial cables.

It is well known in the art that a coil spring, when tightened around a rod like element or cylinder tends to create large frictional forces between itself and the cylinder, preventing the latter from being withdrawn from within the coil. It is this principle which is made use of in a unique way in the instant invention, an embodiment of which is shown holding a cable in a connector equipped with the clamp of this invention.

An object of the invention is to provide a cable clamp which securely holds a cable within it in a novel manner.

Another object of the invention is to provide a cable clamp which can be used to anchor cables of varying diameters in a unique fashion.

A further object of the invention is to provide a cable clamp, the holding power of which can be varied simply.

Still another object of the invention is to provide a cable clamp, the holding forces of which are not diminished by vibrations of either the connector or of the cable.

Another object of the invention is to provide a cable clamp, the holding power of which is not reduced by applying torque to either the cable or the clamp.

Yet another object of the invention is to provide a cable clamp, the maximum holding force of which can be limited to a predetermined value.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in conjunction with the accompanying drawing, in which:

FIGURE 1 is a radially cross-sectioned perspective view of a connector embodying the invention;

FIGURE 2 is an exploded view of a connector embodying the invention; and

FIGURE 3 is a side elevational view of the connector of FIGURES 1 and 2, with parts broken away to show axial cross sections thereof.

With reference to the drawings in which like numerals identify similar parts throughout, it will be seen that cable connector body 10 has an internally threaded socket 11 in which is housed a nest of connector contacts 35 which are adapted to receive an end of a cable 39. The purpose of the contacts 35 will be indicated later with respect to an embodiment of the invention designed for a certain use.

Clamp body 12 is in the form of a sleeve having an externally threaded portion 13 of reduced diameter at one end which is threadably engaged within the threaded socket 11 securely to fasten the clamp body to the connector body 10. The externally threaded end of the clamp body sleeve 12 has a notch 14 therein to receive a tang 15 on one end of a cylindrical coil spring 16. The notch 14 is rectangular in order securely to receive and hold the coil spring tang 15 which is square since the spring preferably is constructed of square stock. However, the notch 14 can be any shape which will tend to retain the spring tang 15 therein. The clamp body sleeve 12 has an internal square thread 17 for threadably receiving a hollow torsion collar 18. In order to facilitate tightening and holding of the clamp body sleeve 12 with a wrench or similar device, two diametrically opposed flat parallel lands 19 are provided on the clamp body's outer surface.

The torsion collar 18 has a left-hand external square thread 20 which permits this collar to be screwed into the clamp body 12. The torsion collar 18 is also provided with a right-hand internal V-shaped thread 21 threadably to receive a tubular back nut 22. Located in the inner surface of the collar 18, is a localized notch 23 adapted to receive and securely to hold another tang 24 provided on the other end of coil spring 16.

Although coil spring 16 is shown as being constructed from square stock, it can be made from stock having any desired cross-sectional shape. It has a left-hand pitch and the outer diameter of coil spring 16 preferably is slightly smaller than the inner diameters of at least the portions of the clamp body sleeve 12 and the torsion collar 18 in which it is shown nested. The end tangs 15 and 24 of the coil spring 16 protrude radially beyond the outer diameter of the latter. Since tang 15 of the coil spring 16 is retained in notch 14 it is prevented from rotating relative to the clamp body sleeve. Since tang 24 of the coil spring 16 seats in localized notch 23 relative rotation between it and the collar 18 is prevented.

In the embodiment illustrated, the coil spring 16 is nested partially within the collar 18 and partially within the clamp body sleeve 12. However, the coil spring 16 may be telescoped substantially entirely within one or the other of these members as long as each end of the coil is respectively connected securely to the collar 18 and the clamp body sleeve 12. Although interfitted notches and tangs may be preferred for secure anchorage of the ends of coil spring 16 many varied equivalent means will readily occur to one skilled in the art for preventing rotation of the ends 15 and 24 of the spring relative to the clamp body sleeve 12 and torsion collar 18 respectively.

The tubular back nut 22 has a through bore 25 which is of an internal diameter large enough to permit free passage of the cable 39 therethrough. The tubular nut 22 has a reduced diameter extension 26 which has a right-hand external V-shaped thread 27, threadably to engage with the internal thread 21 of the torsion collar 18. Enlarged head 28 of tubular nut 22 is provided with a hexagonal outer surface 29 to facilitate its being gripped by a wrench for threadably advancing its threaded extension 26 into the outer end of collar 18. Many equivalent variations are available and will readily occur to a skilled mechanic, for accomplishing the same purpose as is served by the hexagonal shape of surface 29.

An annular transverse shoulder 30 is provided on the inner side of the enlarged head 28 at the base of the threaded portion 26. This annular shoulder 30 abuts the outer end 31 of clamp body sleeve 12 to prevent the back nut 22 from passing more than a predetermined distance into this sleeve.

To assemble the parts of the cable clamp the collar 18 is screwed into the clamp body sleeve 12 and the coil spring is telescoped within these two parts with its end tangs 15 and 24 respectively seated in notches 14 and 23. This sub-assembly is then screwed and tightened into the socket 11 of connector body 10. Then the threaded extension 26 of the back nut 22 is loosely threaded into the internally threaded outer end of the collar 18. The cable clamp assembly shown in the drawing is equipped during such assembly of parts with seal rings, 32, 33 and 34 to prevent moisture from reaching the connector contacts 35 housed within the connector body 10 after the device is placed in service.

This assembled cable clamp is readied for service by inserting an end of the cable 39 through bore 25 of the back nut 22 and forward through coil spring 16 into the nest of connector contacts 35. The embodiment illustrated in the drawing, by way of example, is particularly designed as a coupling for an electrical coaxial cable having an outer conductor 36, and a core conductor 37. The outer conductor 36 will, upon insertion, contact the nest of connector contacts 35. After insertion of the cable the tubular nut is rotated relative to the clamp body sleeve 12. This causes the tubular nut 22 to move axially forward into the entire assembly until the shoulder 30 abuts the outer end 31 of the clamp body sleeve 12. The axially inward displacement of the nut 22 is thereby terminated, and further clockwise rotation of the nut causes clockwise rotation of the collar 18 into which it is threaded. The opposite handed pitches of the threads involved (20 engaged with 17 and 27 engaged with 21) permit this rotation. As the collar 18 is rotated clockwise by nut 22, the left-hand pitch of interengaged threads 20 and 17 cause the collar to move axially outward toward the back nut 22.

Since one end 24 of the coil spring 16 is anchored in notch 23 within the collar 18, it too moves angularly and axially outward as the back nut 22 is rotated clockwise. The combined axial and clockwise angular movement of end 24 of the coil spring 16 relative to its other end 15, which is retained within clamp body sleeve 12, causes the internal diameter of the coil spring to decrease. The decreasing diameter of spring 16 brings it into frictional contact with the cable 39 and the progressive tightening causes the latter to be gripped and retained within the connector assembly.

Although clockwise rotation of the tubular back nut 22 causes clockwise rotation of the torsion collar 18, the two do not rotate at the same speed. The axially outward movement of the collar 18 permits the back nut 22 to be screwed further into the collar before shoulder 30 of the latter is again abutted against the outer end 31 of the clamp body 12 and forces further rotation of the collar. Thus, the clockwise rotation of the nut 22 is simultaneously partially absorbed by its own inward axial movement relative to the collar 18 and partially by the latter's outward axial movement relative to the clamp body sleeve 12.

Rotation of the collar 18 within the clamp body sleeve 12 moves end 24 of the coil spring 16 both axially and angularly relative to its other end 15. This creates axial and torsional forces within the coil spring 16 tending to return it to its unclamped position. As rotation of the torsion collar 18 is resisted by these forces, its clockwise rotation by the back nut 22 is prevented by the coil spring 16 until the nut shoulder 30 abuts the outer end 31 of clamp body sleeve 12. At this point, further rotation of the nut 22 is impossible unless the collar 18 rotates, backing it out axially toward the nut. Since this rotation of the collar 18 deforms the coil spring 16, and since deformation of the coil spring is resisted by the forces developed within it, once shoulder 30 abuts the outer end 31 of clamp body sleeve 12, further clockwise rotation of the back nut 22 requires a constantly increasing torque. The maximum deformation and therefore maximum required torque is reached when the back nut 22 is fully threaded into the torsion collar 18.

Usually, when a coil spring is tightened around a cylinder, it retains the latter within it only as long as the tightening force is applied. When the force is removed the coil spring returns to its undeformed state, releasing the cylinder. Not so with the present invention which utilizes the forces within the deformed coil spring itself to lock it in its deformed state.

The coil spring tends to cause two kinds of movement of the other members of the combination, axial and angular. The axial force increases the frictional forces between the interengaged thread faces of the collar 18 and the clamp body sleeve 12, and between the back nut shoulder 20 and the abutting outer end of the clamp body sleeve. These frictional forces tend to oppose the rotation which is necessary in order that the coil spring may return to its unclamped state. They also prevent the nut 22 from being loosened by vibrations.

Beside the axial force exerted by the coil spring, a torque is also exerted by it. In the embodiment shown, since tightening is accomplished by rotating the nut 22 and collar 18 in the clockwise direction, the torque stored in the coil spring 16 tends to rotate the collar 18 in the counterclockwise direction. It will be observed that, all other parts remaining fixed, rotation of the torsion collar 18 urges it to move in two opposite directions at the same time. The counterclockwise torque tends to move the torsion collar 18 toward the connector contacts 35 on the collar's external left-hand thread, and toward the back nut on the collar's internal right-hand thread 21. Since an object cannot move in two opposite directions at the same time., the torsion collar 18 does not move at all and the coil spring 16 remains tightened around the cable 39.

The locking feature of the present invention has been illustrated with the use of a counterclockwise torque imparted by the coil spring to the torsion collar. A clockwise torque stored in the coil spring will produce the same result, viz, a self-induced lock. The torsion collar will tend to move toward the tightening nut on its external thread but away from the nut on its internal thread.

This locking feature, operating equally well in either direction, prevents external torques, applied either to the cable or to the connector, from loosening the clamp. Since all such torques must be transmitted through the coil spring, they have the same effect as if the coil spring itself was applying the torque, that is, to lock the device in position. Thus, the external torques produce no loosening effects.

The contemplated use of the device will dictate the choice of design variables. The thread profiles and relative degrees of pitch are quite flexible. They should be chosen such that the largest cable to be used is securely held but not substantially deformed when the nut is tightened sufficiently to provide the minimum frictional forces necessary to keep the vibrations from loosening the nut. At the other end of the scale, the smallest cable to be used should be securely held at least by the time the nut is fully threaded into the collar.

It will be appreciated that the pitch directions have been chosen arbitrarily. The device would operate equally as well if the threads were all reversed. The only requirement is that the two threads in the collar have pitches of opposite hand, i.e., one have a right-hand pitch and the other a left-hand pitch. Generally, the direction of pitch of the coil will be the same as that of the external collar thread, however, if it is so desired, the coil spring's pitch may be in the same direction as the pitch of the internal collar thread. With the latter structure, the rotation of one end of the coil relative to the other would tend to loosen the grip on the cable, hence the degrees of pitch of the two threads on the collar should be chosen such that the tightening effect due to the axial movement of one end of the coil spring relative to its other end, would more than compensate for the loosening effect of the rotation.

The device has been shown in the context of a cable connected clamp. Obviously, the unique features of the invention do not reside in the electrical connector characteristics of the illustrated embodiment but are in the gripping and clamping features thereof. Thus, it can be used to advantage in many situations, independently of electrical connector service, where a clamp for a generally cylindrical member is required.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustartive and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A clamp for a rod like element comprising:
   (a) clamping sleeve means having an internal thread of certain hand over at least a portion of its length, and transverse abutment means;
   (b) hollow cylindrical torsion collar means threadably mounted within the internal thread of said sleeve means making a sub-assembly, said collar means having an internal thread over at least a portion of its lentgh of a hand opposite that of the internal thread of said sleeve means;
   (c) a rod like element gripping coil spring mounted within said clamping sleeve means and torsion collar means sub-assembly, having one end secured to the collar means against relative motion thereto and the other end secured to the sleeve means against relative motion thereto;
   (d) a back nut threadably mounted into the collar means internal thread having an abutment face rotatable against said collar abutment means and adapted rotatably to back the collar out of the clamping sleeve means when the back nut is screwed into the latter with the abutment face riding against said abutment means; the degree of pitch of the threads on the collar being such that when the collar is backed, the coil spring will be moved into gripping engagement with a rod like element to be inserted therein and
   (e) means for rotating the back nut relative to the clamping sleeve means.

2. A clamp for a rod like element according to claim 1 in which the internal thread on the clamping sleeve means and the external thread on the collar means are of generally square form and in which the internal thread on the collar means and the external threaded on the back nut are of generally V-form.

3. A cable connector clamp having various states from unclamped to clamped comprising:
   (a) a connector body having two ends and having an internal thread at one of the ends;
   (b) clamping sleeve means having two ends, one of the ends having an external thread, the clamping sleeve means being threadably secured by its externally threaded end to the connector body, the clamping sleeve means having a left-hand internal thread over at least a portion of its length, and transverse abutment means;
   (c) hollow cylindrical torsion collar means having a left-hand external thread of the same pitch and form as the internal thread of the clamping sleeve means, said collar means being threadably mounted within the clamping sleeve means making a sub-assembly, and said collar means having a right-hand internal thread over at least a portion of its length;
   (d) a cable gripping coil mounted within said sub-assembly having a left-hand pitch, and having an external diameter when the clamp is in the unclamped state approximately the same as the internal diameter of the collar means and clamping sleeve means sub-assembly, the coil having two ends, one of the ends being secured to the collar means against relative motion thereto and the other end being secured to the clamping sleeve means against relative motion thereto;
   (e) a back nut having an external right-hand thread of the same pitch, hand and form as the internal thread of the collar means, said nut being threadably mounted in the collar means and having a shoulder adapted rotatably to abut the clamping sleeve means when the nut is threaded into the collar means and to back the collar means out of the sleeve means during rotation after abutment; and
   (f) means for imparting rotation to the nut relative to the clamping sleeve means.

4. A cable connector clamp comprising:
   (a) a connector body;
   (b) clamping sleeve means having two ends, secured at its first end to the connector body and having an internal thread of certain hand over at least a portion of its length, and transverse abutment means;
   (c) hollow cylindrical torsion collar means having an external thread of the same pitch and hand as the thread of the clamping sleeve means, said collar means being threadably mounted within the clamping sleeve means making a sub-assembly, and said collar means having an internal thread over at least a portion of its length of a hand opposite that of its external thread;
   (d) a cable gripping coil spring mounted within the clamping sleeve means and torsion collar means sub-assembly, having one end secured to the collar means against relative motion thereto and the other end secured to the clamping sleeve means against relative motion thereto;
   (e) a back nut having an external thread of the same pitch and hand as that of the internal thread of the collar means, and being threadably mounted into the collar means, said nut having a shoulder adapted rotatably to abut the clamping sleeve means when the nut is threaded into the collar means and to back the collar means out of the clamping sleeve means during rotation after abutment; the degree of pitch of the threads on the collar being such that when the collar is backed, the coil spring will be moved into gripping engagement with a cable to be inserted therein and
   (f) means for imparting rotation to the nut relative to the clamping sleeve means.

5. A cable connector clamp comprising:
   (a) a connector body;
   (b) clamping sleeve means having two ends, secured at its first end to the connector body and having an internal thread of a certain hand over at least a portion of its length, said clamping sleeve means having a generally cylindrical outer surface with at least two flattened lands adapted to be gripped by wrench means;
   (c) hollow cylindrical torsion collar means having an external thread of the same pitch and hand as those of the thread of the clamping sleeve means, said collar means being threadably mounted within the sleeve means making a sub-assembly, and said collar means being internally threaded over at least a portion of its length, the internal thread of the collar means being of opposite hand from that of its external thread;
   (d) a cable gripping coil mounted within the collar means—clamping sleeve means sub-assembly having one end secured to the collar means against relative motion thereto and the other end secured to the clamping sleeve meaans against relative motion thereto; and
   (e) a back nut having an external thread of the same hand as that of the internal thread of the collar means, and being threadably mounted in the collar, said nut having a shoulder adapted rotatably to abut the clamping sleeve means when the nut is threaded into the collar means and to back the collar means out of the sleeve means during rotation after abutment, the degree of pitch of the threads on the collar being such that when the collar is backed, the coil will be moved into gripping engagement with a cable to be inserted therein said nut having a generally cylindrical outer surface with at least two flattened lands adapted to ge gripped by wrench means.

References Cited by the Examiner

UNITED STATES PATENTS

| | | | |
|---|---|---|---|
| 701,020 | 5/1902 | Diescher | 285—318 |
| 978,630 | 12/1910 | Oettgen | 285—318 X |
| 1,814,479 | 7/1931 | Metcalf | 285—318 |

CARL W. TOMLIN, *Primary Examiner.*

D. W. AROLA, *Assistant Examiner.*